United States Patent
Tada et al.

(10) Patent No.: US 9,780,694 B2
(45) Date of Patent: Oct. 3, 2017

(54) POWER CONVERSION DEVICE AND POWER CONVERSION CONTROL METHOD

(71) Applicant: Mitsubishi Electric Corporation, Tokyo (JP)

(72) Inventors: Junji Tada, Tokyo (JP); Kenichi Akita, Tokyo (JP); Katsuya Tsujimoto, Tokyo (JP); Keiichi Komurasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/114,104

(22) PCT Filed: Apr. 7, 2014

(86) PCT No.: PCT/JP2014/060114
§ 371 (c)(1),
(2) Date: Jul. 26, 2016

(87) PCT Pub. No.: WO2015/155823
PCT Pub. Date: Oct. 15, 2015

(65) Prior Publication Data
US 2017/0005593 A1   Jan. 5, 2017

(51) Int. Cl.
*H02M 7/44*  (2006.01)
*H02M 7/5387*  (2007.01)
(Continued)

(52) U.S. Cl.
CPC ....... *H02M 7/53871* (2013.01); *H02M 7/219* (2013.01); *H02P 27/08* (2013.01)

(58) Field of Classification Search
CPC .................................. H02M 7/44; H02M 7/219
(Continued)

(56) References Cited

U.S. PATENT DOCUMENTS 4,777,579 A  *  10/1988   Jahns  .................. H02M 7/5387
                                                      363/132
5,633,793 A  *   5/1997   Lee   ....................... H02M 7/062
                                                      363/127
(Continued)

FOREIGN PATENT DOCUMENTS

| JP | 2008-228450 A | 9/2008 |
| JP | 2010-110176 A | 5/2010 |
| JP | 2012-10555 A  | 1/2012 |

OTHER PUBLICATIONS

International Search Report for PCT/JP2014/060114 dated Jul. 1, 2014.

*Primary Examiner* — Adolf Berhane
*Assistant Examiner* — Nusrat Quddus
(74) *Attorney, Agent, or Firm* — Sughrue Mion, PLLC; Richard C. Turner

(57) ABSTRACT

Provided is a power converter capable of reliably turning OFF a switching element before turn-OFF of a diode even with a fluctuation in rpm so as not to generate a backflow of a current. The power converter includes a diode ON-interval monitoring unit (18) configured to measure a change rate of a diode ON detection interval signal. When a diode ON detection interval change rate signal (S20) exhibits a decrease on a negative side and is smaller than a predetermined value (an absolute value thereof exceeds a predetermined value), an OFF-timing of the switching element is advanced by a predetermined value or larger, to thereby reliably turn OFF the switching element before the turn-OFF of the diode even with the fluctuation in rpm.

7 Claims, 8 Drawing Sheets

(51) Int. Cl.
*H02P 27/08* (2006.01)
*H02M 7/219* (2006.01)

(58) Field of Classification Search
USPC ... 363/37, 40–48, 95, 97, 98, 123, 125, 126, 363/127, 129, 131, 132, 133, 134
See application file for complete search history.

(56) References Cited

U.S. PATENT DOCUMENTS

| | | | | |
|---|---|---|---|---|
| 5,889,339 | A * | 3/1999 | Bildgen | H02M 7/53803 307/125 |
| 6,282,107 | B1 * | 8/2001 | Vinciarelli | H02M 3/33569 363/131 |
| 6,744,649 | B1 * | 6/2004 | Yang | H02M 3/3376 363/132 |
| 7,285,930 | B2 * | 10/2007 | Weinmann | H02P 6/182 318/400.31 |
| 2002/0163822 | A1 * | 11/2002 | Lin | H02M 7/53835 363/98 |
| 2007/0053213 | A1 * | 3/2007 | Brune | H02M 5/4585 363/37 |
| 2008/0205104 | A1 * | 8/2008 | Lev | H05B 37/0263 363/98 |
| 2008/0225565 | A1 | 9/2008 | Tsujimoto et al. | |
| 2011/0317461 | A1 | 12/2011 | Gokan | |
| 2017/0005593 | A1 * | 1/2017 | Tada | H02M 7/53871 |

* cited by examiner

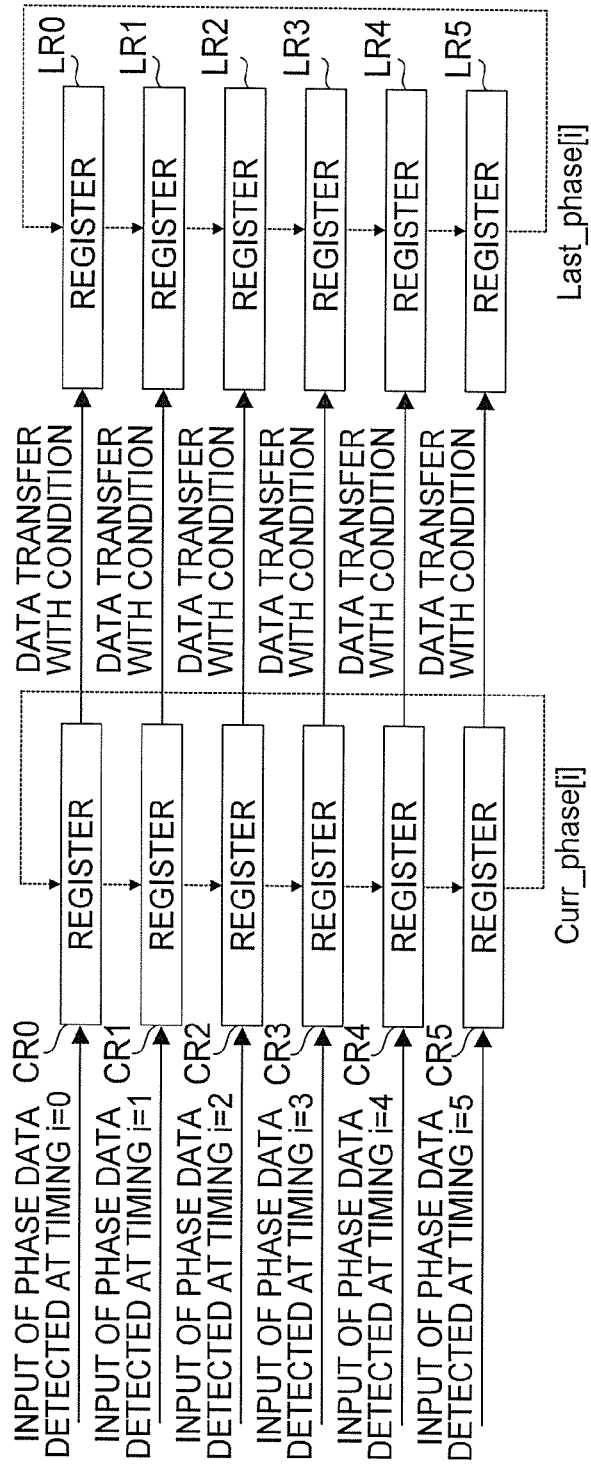
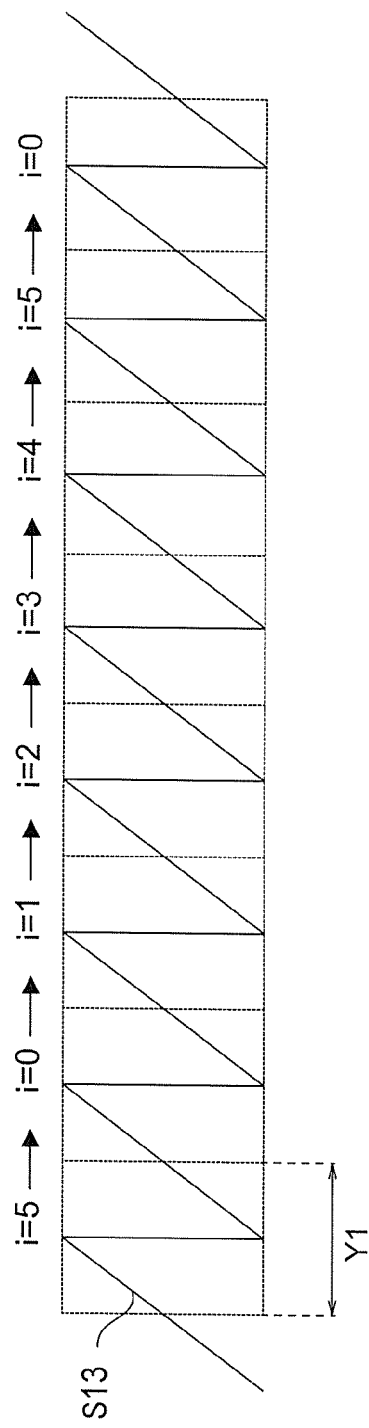
FIG. 6A
FIG. 6B

POWER CONVERSION DEVICE AND POWER CONVERSION CONTROL METHOD

CROSS REFERENCE TO RELATED APPLICATIONS

This application is a National Stage of International Application No. PCT/JP2014/060114 filed Apr. 7, 2014, the contents of which are incorporated herein by reference in their entirety.

TECHNICAL FIELD

The present invention relates to a power converter, and more particularly, to a power converter for a vehicle and a method therefor to be used for a rotary electric motor for a vehicle, which is mounted in a vehicle, e.g., an automobile.

BACKGROUND ART

In rotary electric motors for a vehicle, a full-wave rectification system using diodes as rectifying elements is generally known. For higher efficiency, a rectification system using switching elements as the rectifying elements so as to reduce a loss generated due to the rectifying elements is increasingly used.

There has already been proposed a power converter for a vehicle, which is configured to use the switching elements as the rectifying elements and obtain an estimated angular position at which the diodes are turned ON and OFF through a phase-locked loop circuit so as to control ON and OFF of the switching elements based on the estimated angular position without mounting a rotational position detecting sensor (see, for example, Patent Literature 1).

CITATION LIST

Patent Literature

[PTL 1] JP 2012-10555 A

SUMMARY OF INVENTION

Technical Problem

The power converter for a vehicle described in Patent Literature 1 is configured to measure an ON time period in which the diode is turned ON after detection of turn-OFF of the switching element when a timing for turning OFF the switching element is set. Then, based on a result of comparison between a measurement value and a target value, an OFF timing for the next switching element is set. When an rpm shifts to a high-speed side, a divergence between the estimated angular position and an actual angular position is increased to turn OFF the diode earlier than an estimated diode OFF timing. Therefore, the OFF timing of the switching element sometimes happens after the diode OFF timing depending on the target value. As a result, there is a problem in that a current flows back to a proper direction at the time of power generation to generate a large fluctuation or drop in output voltage of a power supply.

The present invention has an object to provide a power converter capable of reliably turning OFF a switching element before turn-OFF of a diode even with a fluctuation in rpm so as to prevent occurrence of a backflow of a current.

Solution to Problem

According to one embodiment of the present invention, there are provided a power converter and the like, including: a power converting unit including: 2N switching elements for N phases, where N is an integer equal to or larger than 2, the 2N switching elements being provided for each of a higher arm and a lower arm; and 2N freewheeling diodes respectively connected in parallel to the 2N switching elements; and a gate control unit including: a diode conducting state detecting unit configured to detect ON timings and OFF timings of the 2N freewheeling diodes from voltages of portions of the power converting unit; a synchronized signal generating and monitoring unit configured to generate an ON synchronized signal being subjected to synchronization control based on the ON timings of the 2N freewheeling diodes and to generate an OFF synchronized signal being subjected to synchronization control based on the OFF timings of the 2N freewheeling diodes, the ON timings and the OFF timings being detected by the diode conducting state detecting unit; a gate command generation PWM unit configured to generate a gate command signal for performing switching control on the switching element based on the ON synchronized signal and the OFF synchronized signal; a gate ON-state detecting unit configured to detect ON timings and OFF timings of the 2N switching elements from the voltages of the portions of the power converting unit; a gate command monitoring unit configured to generate a diode ON detection interval signal based on the gate ON timings of the 2N switching elements, the gate ON timings being detected by the gate ON-state detecting unit, and the gate command signal generated by the gate command generation PWM unit; and a diode ON-interval monitoring unit configured to measure a change rate of the diode ON detection interval signal generated by the gate command monitoring unit, in which the gate command generation PWM unit is configured to adjust the gate command signal so as to adjust the OFF timing of the switching element in accordance with the change rate of the diode ON detection interval signal measured by the diode ON-interval monitoring unit.

According to the power converter and the like of the present invention, in the power converter for a vehicle that does not require a sensor configured to detect a rotational position, the switching element is reliably turned OFF before the turn-OFF of the diode even with the fluctuation in rpm, thereby enabling the prevention of the backflow of the current.

BRIEF DESCRIPTION OF DRAWINGS

FIG. 6A and FIG. 6B are a diagram and a chart for illustrating a phase determination made by the cycle checking unit illustrated in FIG. 1.

DESCRIPTION OF EMBODIMENTS

Now, a power converter for a vehicle as an example of a power converter according to an embodiment of the present invention is described with reference to the drawings. In each of the embodiments, the same or corresponding portions are denoted by the same reference symbols, and the overlapping description thereof is omitted. The present invention is not limited to the embodiment for a vehicle described below.

First Embodiment

Figure 1:
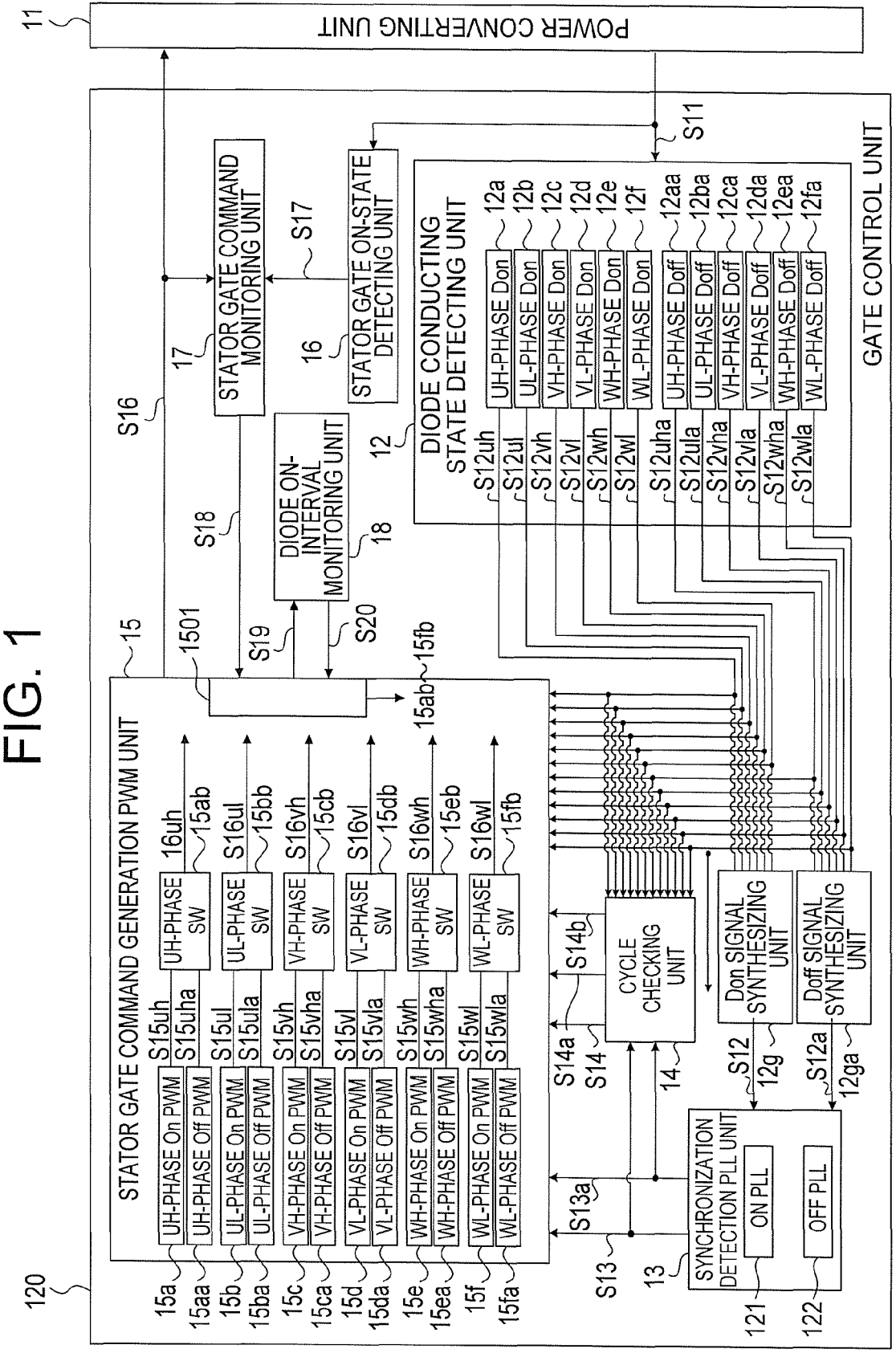
FIG. 1 is a block diagram for illustrating a schematic configuration of a power converter according to one embodiment of the present invention.

FIG. 1 is a block diagram for illustrating a schematic configuration of a power converter for a vehicle according to a first embodiment of the present invention. In the following description,

- a U-phase higher arm is referred to as "UH phase",
- a U-phase lower arm is referred to as "UL phase",
- a V-phase higher arm is referred to as "VH phase",
- a V-phase lower arm is referred to as "VL phase",
- a W-phase higher arm is referred to as "WH phase", and
- a W-phase lower arm is referred to as "WL phase".

In this case, the higher arm and the lower arm are distinguished from each other for each of three phases corresponding to U-, V-, and W-phases so that 2×3=6 phases are treated as a total number of phases.

In FIG. 1, the power converter includes a gate control unit 120 and a power converting unit 11. The power converting unit 11 is configured to perform power conversion based on a stator gate command signal S16 generated in the gate control unit 120. The gate control unit 120 is configured to generate the stator gate command signal S16 based on a voltage detection signal S11 output from the power converting unit 11.

Figure 2:
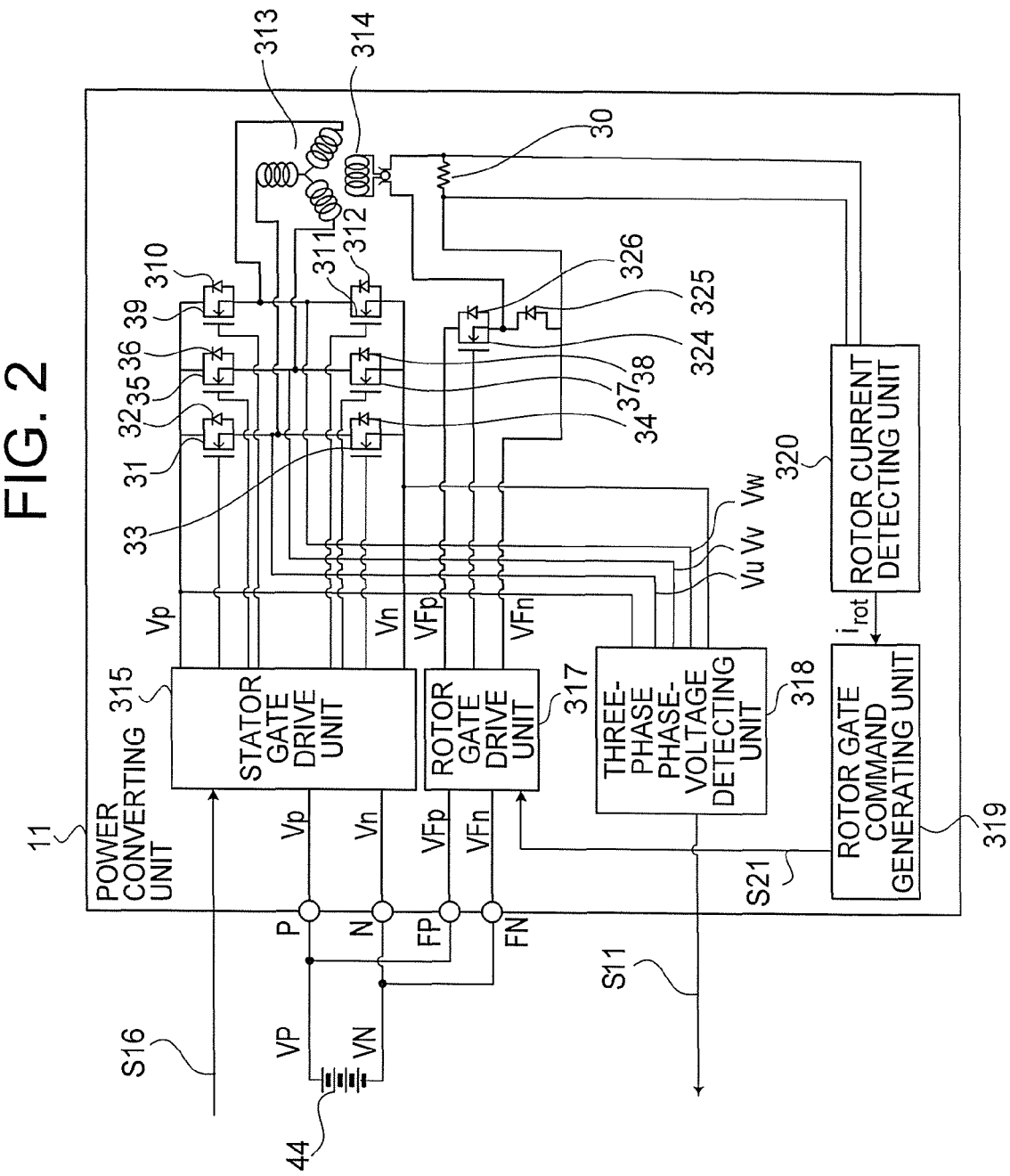
FIG. 2 is a block diagram for illustrating an example of a schematic configuration of a power converting unit illustrated in FIG. 1.

FIG. 2 is a block diagram for illustrating an example of a schematic configuration of the power converting unit illustrated in FIG. 1. As illustrated in FIG. 2, the power converting unit 11 includes a three-phase armature winding 313 provided to a stator and a field winding 314 provided to a rotator (also referred to as "rotor") to form a rotating electric motor.

Further, the power converting unit 11 includes positive terminals P and FP and negative terminals N and FN. The positive terminals P and FP are connected to a positive side of a storage battery 44, whereas the negative terminals N and FN are connected to a negative side of the storage battery 44. A capacitor may be used in place of the storage battery 44. A DC load voltage is applied as a positive voltage VP of the storage battery 44, whereas a ground voltage is applied as a negative voltage VN of the storage battery 44.

A U-phase higher arm switching element (hereinafter referred to as "UH element") 31, a U-phase lower arm switching element (hereinafter referred to as "UL element") 33, a V-phase higher arm switching element (hereinafter referred to as "VH element") 35, a V-phase lower arm switching element (hereinafter referred to as "VL element") 37, a W-phase higher arm switching element (hereinafter referred to as "WH element") 39, and a W-phase lower arm switching element (hereinafter referred to as "WL element") 311 are provided on the stator side (313).

As the UH element 31, the UL element 33, the VH element 35, the VL element 37, the WH element 39, and the WL element 311, IGBTs, bipolar transistors, or field-effect transistors may be used.

A U-phase higher arm freewheeling diode (hereinafter referred to as "UH diode") 32 is connected in parallel to the UH element 31, a U-phase lower arm freewheeling diode (hereinafter referred to as "UL diode") 34 is connected in parallel to the UL element 33, a V-phase higher arm freewheeling diode (hereinafter referred to as "VH diode") 36 is connected in parallel to the VH element 35, a V-phase lower arm freewheeling diode (hereinafter referred to as "VL diode") 38 is connected in parallel to the VL element 37, a W-phase higher arm freewheeling diode (hereinafter referred to as "WH diode") 310 is connected in parallel to the WH element 39, and a W-phase lower arm freewheeling diode (hereinafter referred to as "WL diode") 312 is connected in parallel to the WL element 311.

The UH element 31, the UL element 33, the VH element 35, the VL element 37, the WH element 39, and the WL element 311 form a three-phase bridge circuit. A connection point between the UH element 31 and the UL element 33 is connected to a U-phase terminal of the armature winding 313, a connection point between the VH element 35 and the VL element 37 is connected to a V-phase terminal of the armature winding 313, and a connection point between the WH element 39 and the WL element 311 is connected to a W-phase terminal of the armature winding 313, resulting in connection to the electric motor at equiangular intervals in a circular manner.

A connection point between the UH element 31, the VH element 35, and the WH element 39 is connected to the positive terminal P through a stator gate drive unit 315, whereas a connection point between the UL element 33, the VL element 37, and the WL element 311 is connected to the negative terminal N through the stator gate drive unit 315.

The stator gate drive unit 315 and a three-phase phase-voltage detecting unit 318 are provided on the stator side (313). The stator gate drive unit 315 is configured to drive a gate of the UH element 31, a gate of the UL element 33, a gate of the VH element 35, a gate of the VL element 37, a gate of the WH element 39, and a gate of the WL element 311 based on the stator gate command signal S16 so as to turn ON/OFF the UH element 31, the UL element 33, the VH element 35, the VL element 37, the WH element 39, and the WL element 311.

The three-phase phase-voltage detecting unit 318 is configured to detect a positive terminal voltage Vp to be applied to the connection point between the UH element 31, the VH element 35, and the WH element 39, a negative terminal voltage Vn to be applied to the connection point between the UL element 33, the VL element 37, and the WL element 311, a U-phase induction voltage Vu generated at the connection point between the UH element 31 and the UL element 33, a V-phase induction voltage Vv generated at the connection point between the VH element 35 and the VL element 37, and a W-phase induction voltage Vw generated at the connection point between the WH element 39 and the WL element 311 so as to output the resultant voltages as the voltage detection signal S11.

A field switching element 324 configured to perform pulse width modulation (PWM) control on a field current is provided on the rotor side (314). A field freewheeling diode 326 is connected in parallel to the field switching element 324. As the field switching element 324, an IGBT, a bipolar transistor, or a field effect transistor may be used.

A diode 325 is connected between a pair of electric wires respectively connected to both ends of the field wiring 314. The field switching element 324 is placed in one of the electric wires, whereas a resistor 30 is placed in another thereof.

Further, a rotor gate drive unit 317, a rotor gate command generating unit 319, and a rotor current detecting unit 320 are provided on the rotor side. The rotor current detecting unit 320 is configured to output a detected value $i_{rot}$ of a rotor current based on a voltage across both ends of the resistor 30. The rotor gate command generating unit 319 is configured to generate a rotor gate command signal S21 based on the detected value $i_{rot}$ of the rotor current. The rotor gate drive unit 317 is configured to drive a gate of the field switching element 324 based on the rotor gate command signal S21 so as to turn ON/OFF the field switching element 324.

Although the three-phase field winding system generator motor including the three-phase armature winding 313 provided to the stator and the field winding 314 provided to the rotator is illustrated in FIG. 2, the number of phases and the field system are not limited thereto. For example, a permanent magnet system including multiple phases other than three phases or the like may be used. Further, a generator motor apparatus of a separate structure system including the three-phase armature winding 313 included in the power converting unit 11 and the field winding 314 provided to the rotator, which are physically separated from other components, may be used without being limited to an integral structure generator motor that includes the power converting unit 11 in an integrated manner.

The gate drive unit 120 includes, as illustrated in FIG. 1, a diode conducting state detecting unit 12, a synchronization detection PLL unit 13, a cycle checking unit 14, a stator gate command generation PWM unit 15, a stator gate ON-state detecting unit 16, a stator gate command monitoring unit 17, a diode ON-interval monitoring unit 18, a diode ON-signal synthesizing unit (hereinafter referred to as "Don signal synthesizing unit") 12g, and a diode OFF-signal synthesizing unit (hereinafter referred to as "Doff signal synthesizing unit") 12ga.

The voltage detection signal S11 is input to the diode conducting state detecting unit 12 so that ON timings and OFF timings of six diodes corresponding to the UH diode 32, the UL diode 34, the VH diode 36, the VL diode 38, the WH diode 310, and the WL diode 312 illustrated in FIG. 2 are detected.

The diode conducting state detecting unit 12 includes:

a U-phase higher arm diode ON-signal detecting unit (hereinafter referred to as "UH-phase Don signal detecting unit") 12a;

a U-phase lower arm diode ON-signal detecting unit (hereinafter referred to as "UL-phase Don signal detecting unit") 12b;

a V-phase higher arm diode ON-signal detecting unit (hereinafter referred to as "VH-phase Don signal detecting unit") 12c;

a V-phase lower arm diode ON-signal detecting unit (hereinafter referred to as "VL-phase Don signal detecting unit") 12d;

a W-phase higher arm diode ON-signal detecting unit (hereinafter referred to as "WH-phase Don signal detecting unit") 12e;

a W-phase lower arm diode ON-signal detecting unit (hereinafter referred to as "WL-phase Don signal detecting unit") 12f;

a U-phase higher arm diode OFF-signal detecting unit (hereinafter referred to as "UH-phase Doff signal detecting unit") 12aa;

a U-phase lower arm diode OFF-signal detecting unit (hereinafter referred to as "UL-phase Doff signal detecting unit") 12ba;

a V-phase higher arm diode OFF-signal detecting unit (hereinafter referred to as "VH-phase Doff signal detecting unit") 12ca;

a V-phase lower arm diode OFF-signal detecting unit (hereinafter referred to as "VL-phase Doff signal detecting unit") 12da;

a W-phase higher arm diode OFF-signal detecting unit (hereinafter referred to as "WH-phase Doff signal detecting unit") 12ea; and a W-phase lower arm diode OFF-signal detecting unit (hereinafter referred to as "WL-phase Doff signal detecting unit") 12fa.

The UH-phase Don signal detecting unit 12a is configured to output a U-phase higher arm diode ON detection signal (hereinafter referred to as "UH-phase Don detection signal") S12uh based on the ON timing of the UH diode 32.

The UL-phase Don signal detecting unit 12b is configured to output a U-phase lower arm diode ON detection signal (hereinafter referred to as "UL-phase Don detection signal") S12ul based on the ON timing of the UL diode 34.

The VH-phase Don signal detecting unit 12c is configured to output a V-phase higher arm diode ON detection signal (hereinafter referred to as "VH-phase Don detection signal") S12vh based on the ON timing of the VH diode 36.

The VL-phase Don signal detecting unit 12d is configured to output a V-phase lower arm diode ON detection signal (hereinafter referred to as "VL-phase Don detection signal") S12vl based on the ON timing of the VL diode 38.

The WH-phase Don signal detecting unit 12e is configured to output a W-phase higher arm diode ON detection signal (hereinafter referred to as "WH-phase Don detection signal") S12wh based on the ON timing of the WH diode 310.

The WL-phase Don signal detecting unit 12f is configured to output a W-phase lower arm diode ON detection signal (hereinafter referred to as "WL-phase Don detection signal") S12wl based on the ON timing of the WL diode 312.

The UH-phase Doff signal detecting unit 12aa is configured to output a U-phase higher arm diode OFF detection signal (hereinafter referred to as "UH-phase Doff detection signal") S12uha based on the OFF timing of the UH diode 32.

The UL-phase Doff signal detecting unit 12ba is configured to output a U-phase lower arm diode OFF detection signal (hereinafter referred to as "UL-phase Doff detection signal") S12ula based on the OFF timing of the UL diode 34.

The VH-phase Doff signal detecting unit 12ca is configured to output a V-phase higher arm diode OFF detection signal (hereinafter referred to as "VH-phase Doff detection signal") S12vha based on the OFF timing of the VH diode 36.

The VL-phase Doff signal detecting unit 12da is configured to output a V-phase lower arm diode OFF detection signal (hereinafter referred to as "VL-phase Doff detection signal") S12vla based on the OFF timing of the VL diode 38.

The WH-phase Doff signal detecting unit 12ea is configured to output a W-phase higher arm diode OFF detection signal (hereinafter referred to as "WH-phase Doff detection signal") S12wha based on the OFF timing of the WH diode 310.

The WL-phase Doff signal detecting unit 12*fa* is configured to output a W-phase lower arm diode OFF detection signal (hereinafter referred to as "WL-phase Doff detection signal") S12*wla* based on the OFF timing of the WL diode 312.

For example, synchronous counters may be used as the UH-phase Don signal detecting unit 12*a*, the UL-phase Don signal detecting unit 12*b*, the VH-phase Don signal detecting unit 12*c*, the VL-phase Don signal detecting unit 12*d*, the WH-phase Don signal detecting unit 12*e*, the WL-phase Don signal detecting unit 12*f*, the UH-phase Doff signal detecting unit 12*aa*, the UL-phase Doff signal detecting unit 12*ba*, the VH-phase Doff signal detecting unit 12*ca*, the VL-phase Doff signal detecting unit 12*da*, the WH-phase Doff signal detecting unit 12*ea*, and the WL-phase Doff signal detecting unit 12*fa*.

Through the use of the synchronous counters, ON or OFF of the diodes is continuously detected within a predetermined time period so that whether the diodes are ON or OFF can be determined. As a result, a false detection caused by mixing of noise can be reduced.

The Don signal synthesizing unit 12*g* is configured to generate a diode ON synthesized signal S12 obtained by integrating the UH-phase Don detection signal S12*uh*, the UL-phase Don detection signal S12*ul*, the VH-phase Don detection signal S12*vh*, the VL-phase Don detection signal S12*vl*, the WH-phase Don detection signal S12*wh*, and the WL-phase Don detection signal S12*wl* in the same temporal sequence.

The Doff signal synthesizing unit 12*ga* is configured to generate a diode OFF synthesized signal S12*a* obtained by integrating the UH-phase Doff detection signal S12*uha*, the UL-phase Doff detection signal S12*ul a*, the VH-phase Doff detection signal S12*vha*, the VL-phase Doff detection signal S12*vl a*, the WH-phase Doff detection signal S12*wha*, and the WL-phase Doff detection signal S12*wla* in the same temporal sequence.

For example, a six-input OR circuit may be used as each of the Don signal synthesizing unit 12*g* and the Doff signal synthesizing unit 12*ga*. The Don signal synthesizing unit 12*g* may be configured so as to communalize (integrate in the same temporal sequence) outputs of the UH-phase Don signal detecting unit 12*a*, the UL-phase Don signal detecting unit 12*b*, the VH-phase Don signal detecting unit 12*c*, the VL-phase Don signal detecting unit 12*d*, the WH-phase Don signal detecting unit 12*e*, and the WL-phase Don signal detecting unit 12*f* through a buffer, whereas the Doff signal synthesizing unit 12*ga* may be configured so as to communalize (integrate in the same temporal sequence) outputs of the UH-phase Doff signal detecting unit 12*aa*, the UL-phase Doff signal detecting unit 12*ba*, the VH-phase Doff signal detecting unit 12*ca*, the VL-phase Doff signal detecting unit 12*da*, the WH-phase Doff signal detecting unit 12*ea*, and the WL-phase Doff signal detecting unit 12*fa* through a buffer.

The synchronization detection PLL unit 13 is configured to generate an ON synchronized signal S13 that has been subjected to synchronization control based on the diode ON synthesized signal S12 and an OFF synchronized signal S13*a* that has been subjected to synchronization control based on the diode OFF synthesized signal S12*a*. Specifically, the synchronization detection PLL unit 13 may include an ON PLL circuit 121 and an OFF PLL circuit 122. The ON PLL circuit 121 is configured to generate the ON synchronized signal S13 that has been subjected to synchronization control based on the diode ON synthesized signal S12. The OFF PLL circuit 122 is configured to generate the OFF synchronized signal S13*a* that has been subjected to synchronization control based on the diode OFF synthesized signal S12*a*.

The ON synchronized signal S13 and the OFF synchronized signal S13*a* can be generated independently of each other. Specifically, the synchronization detection PLL unit 13 may include the ON PLL circuit 121 and the OFF PLL circuit 122. The ON PLL circuit 121 may be configured to generate the ON synchronized signal S13 that has been subjected to the synchronization control based on the diode ON synthesized signal S12. The OFF PLL circuit 122 may be configured to generate the OFF synchronized signal S13*a* that has been subjected to the synchronization control based on the diode OFF synthesized signal S12*a*.

Figure 3:
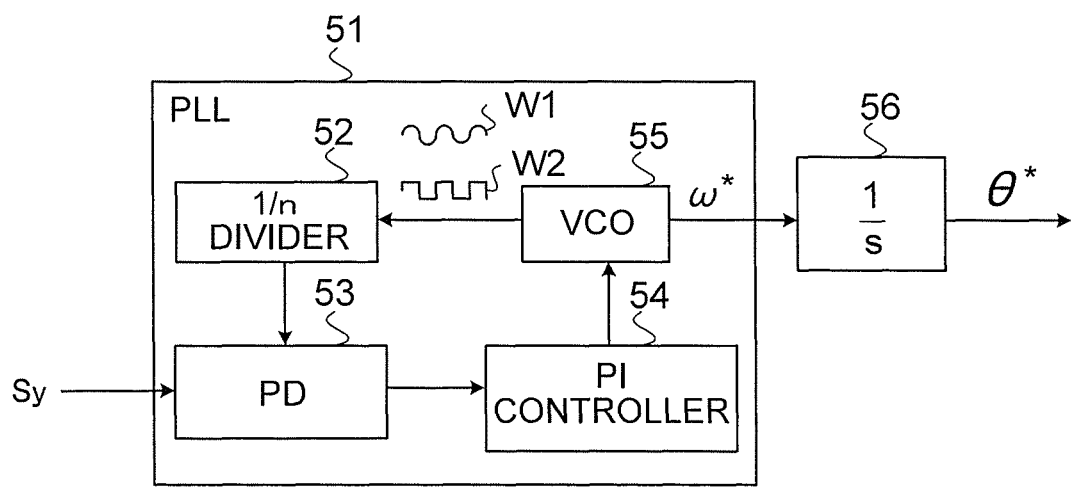
FIG. 3 is a block diagram for illustrating an example of a phase-locked loop circuit used for the power converter illustrated in FIG. 1.

FIG. 3 is a block diagram for illustrating an example of a phase-locked loop circuit to be used in each of the ON PLL circuit 121 and the OFF PLL circuit 122 of the synchronization detection PLL unit 13 of the power converter illustrated in FIG. 1. In FIG. 3, the phase-locked loop circuit (PLL) 51 includes a 1/n divider 52, a phase comparator (PD) 53, a PI controller (P (proportional) I (integral) control) 54, and a voltage control oscillator (VCO) 55. A low-pass filter may be used in place of the PI controller 54.

An oscillation signal $\omega'$ generated in the voltage control oscillator 55 is divided by n (n is a positive integer) in the 1/n divider 52 and is then input to the phase comparator 53. A waveform of the oscillation signal $\omega^*$ may be a sine wave W1 or a square wave W2. Then, the oscillation signal $\omega^*$ is compared with an externally input periodic signal Sy in phase in the phase comparator 53. A result of the comparison is input to the voltage control oscillator 55 through the PI controller 54, thereby controlling a frequency of the oscillation signal $\omega^*$ so that the phase of the oscillation signal $\omega^*$ becomes equal to the phase of the periodic signal Sy. Then, the oscillation signal $\omega^*$ is integrated in an integrator (1/s) 56 to generate a triangular wave signal $\theta^*$. Assuming that the frequency of the oscillation signal $\omega^*$ is f, the oscillation signal $\omega^*$ is converted into an angular velocity based on an expression: $\omega^* = 2\pi f$ and is then integrated in the integrator 56, thereby obtaining an estimated output of the angular position.

When the phase-locked loop circuit 51 and the integrator 56 are used for the ON PLL circuit 121 illustrated in FIG. 1, the triangular wave signal $\theta^*$ is output as the ON synchronized signal S13 by using the diode ON synthesized signal S12 as the periodic signal Sy.

When the phase-locked loop circuit 51 and the integrator 56 are used for the OFF PLL circuit 122 illustrated in FIG. 1, the triangular wave signal $\theta^*$ is output as the OFF synchronized signal S13*a* by using the diode OFF synthesized signal S12*a* as the periodic signal Sy.

In FIG. 1, the cycle checking unit 14 is configured to compare the UH-phase Don detection signal S12*uh*, the UL-phase Don detection signal S12*ul*, the VH-phase Don detection signal S12*vh*, the VL-phase Don detection signal S12*vl*, the WH-phase Don detection signal S12*wh*, the WL-phase Don detection signal S12*wl*, the UH-phase Doff detection signal S12*uha*, the UL-phase Doff detection signal S12*ul a*, the VH-phase Doff detection signal S12*vha*, the VL-phase Doff detection signal S12*vla*, the WH-phase Doff detection signal S12*wha*, and the WL-phase Doff detection signal S12*wla* with the ON synchronized signal S13 and the OFF synchronized signal S13*a* so as to monitor whether or not cycles of the U-phase induction voltage Vu, the V-phase induction voltage Vv, and the W-phase induction voltage Vw and an order of detection are correct over all the phases.

The stator gate command generation PWM unit 15 is configured to generate the gate command signal S16 for performing switching control on the UH element 31, the UL element 33, the VH element 35, the VL element 37, the WH element 39, and the WL element 311 based on the ON synchronized signal S13 and the OFF synchronized signal S13a.

In this case, the stator gate command generation PWM unit 15 includes:

a U-phase higher arm ON triangular wave generating unit (UH-phase On PWM) 15a;

a U-phase higher arm OFF triangular wave generating unit (UH-phase Off PWM) 15aa;

a U-phase higher arm gate command signal generating unit (UH-phase SW) 15ab;

a U-phase lower arm ON triangular wave generating unit (UL-phase On PWM) 15b;

a U-phase lower arm OFF triangular wave generating unit (UL-phase Off PWM) 15ba;

a U-phase lower arm gate command signal generating unit (UL-phase SW) 15bb;

a V-phase higher arm ON triangular wave generating unit (VH-phase On PWM) 15c;

a V-phase higher arm OFF triangular wave generating unit (VH-phase Off PWM) 15ca;

a V-phase higher arm gate command signal generating unit (VH-phase SW) 15cb;

a V-phase lower arm ON triangular wave generating unit (VL-phase On PWM) 15d;

a V-phase lower arm OFF triangular wave generating unit (VL-phase Off PWM) 15da;

a V-phase lower arm gate command signal generating unit (VL-phase SW) 15db;

a W-phase higher arm ON triangular wave generating unit (WH-phase On PWM) 15e;

a W-phase higher arm OFF triangular wave generating unit (WH-phase Off PWM) 15ea;

a W-phase higher arm gate command signal generating unit (WH-phase SW) 15eb;

a W-phase lower arm ON triangular wave generating unit (WL-phase On PWM) 15f;

a W-phase lower arm OFF triangular wave generating unit (WL-phase Off PWM) 15fa; and a W-phase lower arm gate command signal generating unit (WL-phase SW) 15fb.

The U-phase higher arm ON triangular wave generating unit 15a is configured to generate a U-phase higher arm ON triangular wave (hereinafter referred to as "UH-phase ON triangular wave") S15uh based on the ON synchronized signal S13 output from a previous ON timing to a current ON timing of the UH diode 32, each timing being indicated by the UH-phase Don detection signal S12uh.

The U-phase higher arm OFF triangular wave generating unit 15aa is configured to generate a U-phase higher arm OFF triangular wave (hereinafter referred to as "UH-phase OFF triangular wave") S15uha based on the OFF synchronized signal S13a output from a previous OFF timing to a current OFF timing of the UH diode 32, each timing being indicated by the UH-phase Doff detection signal S12uha.

The U-phase higher arm gate command signal generating unit 15ab is configured to generate a gate command signal S16uh for the UH element 31 based on a result of comparison between the UH-phase ON triangular wave S15uh and the UH-phase OFF triangular wave S15uha.

The U-phase lower arm ON triangular wave generating unit 15b is configured to generate a U-phase lower arm ON triangular wave (hereinafter referred to as "UL-phase ON triangular wave") S15ul based on the ON synchronized signal S13 output from a previous ON timing to a current ON timing of the UL diode 34, each timing being indicated by the UL-phase Don detection signal S12ul.

The U-phase lower arm OFF triangular wave generating unit 15ba is configured to generate a U-phase lower arm OFF triangular wave (hereinafter referred to as "UH-phase OFF triangular wave") S15ula based on the OFF synchronized signal S13a output from a previous OFF timing to a current OFF timing of the UL diode 34, each timing being indicated by the UL-phase Doff detection signal S12ula.

The U-phase lower arm gate command signal generating unit 15bb is configured to generate a gate command signal S16ul for the UL element 33 based on a result of comparison between the UL-phase ON triangular wave S15ul and the UL-phase OFF triangular wave S15ula.

The V-phase higher arm ON triangular wave generating unit 15c is configured to generate a V-phase higher arm ON triangular wave (hereinafter referred to as "VH-phase ON triangular wave") S15vh based on the ON synchronized signal S13 output from a previous ON timing to a current ON timing of the VH diode 36, each timing being indicated by the VH-phase Don detection signal S12vh.

The V-phase higher arm OFF triangular wave generating unit 15ca is configured to generate a V-phase higher arm OFF triangular wave (hereinafter referred to as "VH-phase OFF triangular wave") S15vha based on the OFF synchronized signal S13a output from a previous OFF timing to a current OFF timing of the VH diode 36, each timing being indicated by the VH-phase Doff detection signal S12vha.

The V-phase higher arm gate command signal generating unit 15cb is configured to generate a gate command signal S16vh for the VH element 35 based on a result of comparison between the VH-phase ON triangular wave S15vh and the VH-phase OFF triangular wave S15vha.

The V-phase lower arm ON triangular wave generating unit 15d is configured to generate a V-phase lower arm ON triangular wave (hereinafter referred to as "VL-phase ON triangular wave") S15vl based on the ON synchronized signal S13 output from a previous ON timing to a current ON timing of the VL diode 38, each timing being indicated by the VL-phase Don detection signal S12vl.

The V-phase lower arm OFF triangular wave generating unit 15da is configured to generate a V-phase lower arm OFF triangular wave (hereinafter referred to as "VL-phase OFF triangular wave") S15vla based on the OFF synchronized signal S13a output from a previous OFF timing to a current OFF timing of the VL diode 38, each timing being indicated by the VL-phase Doff detection signal S12vl a.

The V-phase lower arm gate command signal generating unit 15db is configured to generate a gate command signal S16vl for the VL element 37 based on a result of comparison between the VL-phase ON triangular wave S15vl and the VL-phase OFF triangular wave S15vl a.

The W-phase higher arm ON triangular wave generating unit 15e is configured to generate a W-phase higher arm ON triangular wave (hereinafter referred to as "WH-phase ON triangular wave") S15wh based on the ON synchronized signal S13 output from a previous ON timing to a current ON timing of the WH diode 310, each timing being indicated by the WH-phase Don detection signal S12wh.

The W-phase higher arm OFF triangular wave generating unit 15ea is configured to generate a W-phase higher arm OFF triangular wave (hereinafter referred to as "WH-phase OFF triangular wave") S15wha based on the OFF synchronized signal S13a output from a previous OFF timing to a current OFF timing of the WH diode 310, each timing being indicated by the WH-phase Doff detection signal S12wha.

The W-phase higher arm gate command signal generating unit 15eb is configured to generate a gate command signal S16vh for the WH element 39 based on a result of comparison between the WH-phase ON triangular wave S15wh and the WH-phase OFF triangular wave S15wha.

The W-phase lower arm ON triangular wave generating unit 15f is configured to generate a W-phase lower arm ON triangular wave (hereinafter referred to as "WL-phase ON triangular wave") S15wl based on the ON synchronized signal S13 output from a previous ON timing to a current ON timing of the WL diode 312, each timing being indicated by the WL-phase Don detection signal S12wl.

The W-phase lower arm OFF triangular wave generating unit 15fa is configured to generate a W-phase lower arm OFF triangular wave (hereinafter referred to as "WL-phase OFF triangular wave") S15wla based on the OFF synchronized signal S13a output from a previous OFF timing to a current OFF timing of the WL diode 312, each timing being indicated by the WL-phase Doff detection signal S12wla.

The W-phase lower arm gate command signal generating unit 15fb is configured to generate a gate command signal S16wl for the WL element 311 based on a result of comparison between the WL-phase ON triangular wave S15wl and the WL-phase OFF triangular wave S15wla.

Figure 4:
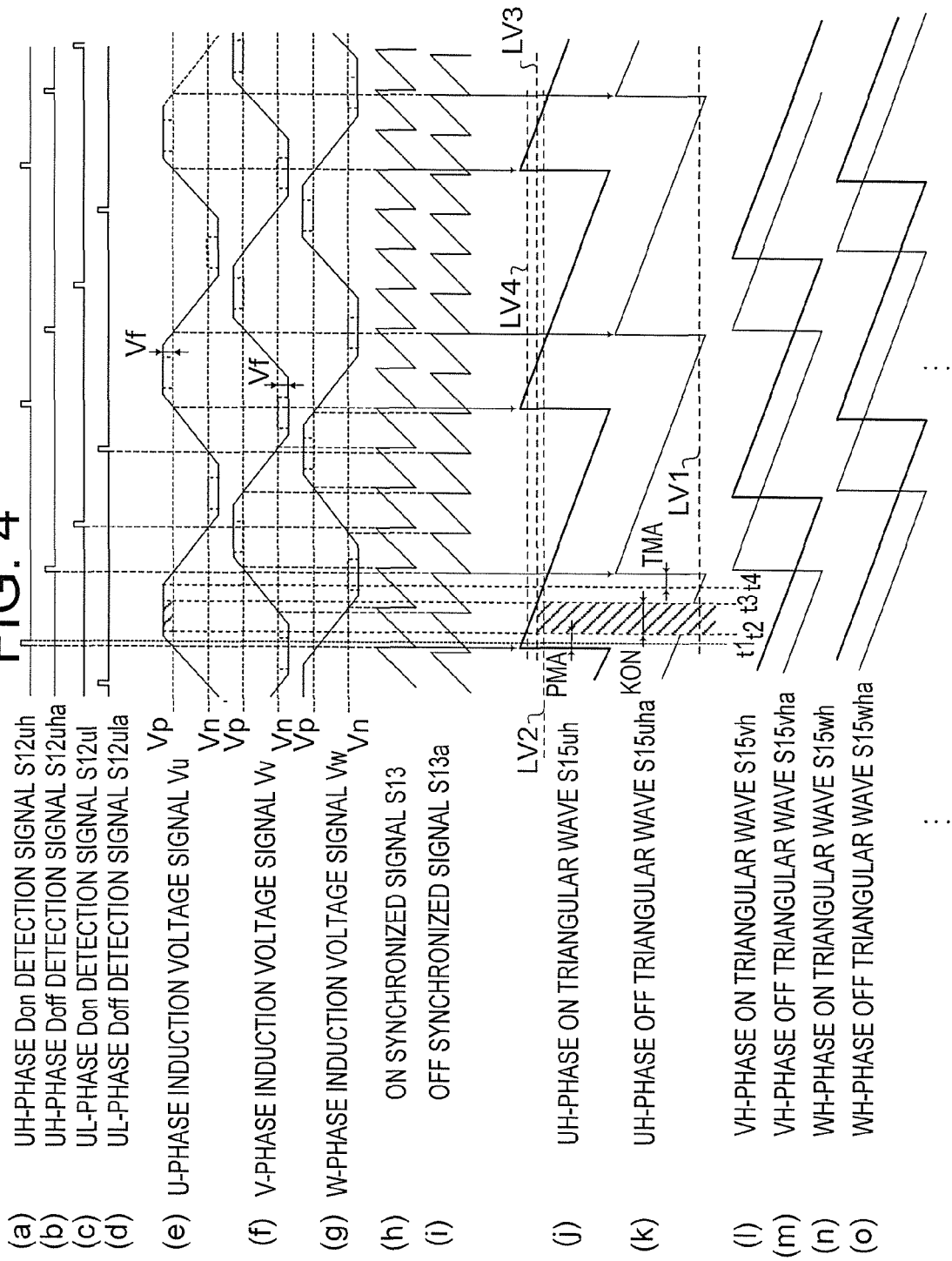
FIG. 4 is a timing chart for illustrating signal waveforms from units of the power converter illustrated in FIG. 1.

FIG. 4 is a timing chart for illustrating signal waveforms from the units of the power converter illustrated in FIG. 1. In an example of FIG. 4, (a) the UH-phase Don detection signal S12uh, (c) the UL-phase Don detection signal S12ul, (b) the UH-phase Doff detection signal S12uha, and (d) the UL-phase Doff detection signal S12ula of the U-phase are illustrated, and the description is omitted for the VH-phase Don detection signal S12vh, the VL-phase Don detection signal S12vl, the WH-phase Don detection signal S12wh, the WL-phase Don detection signal S12wl, the VH-phase Doff detection signal S12vha, the VL-phase Doff detection signal S12vla, the WH-phase Doff detection signal S12wha, and the WL-phase Doff detection signal S12wla of the V-phase and the W-phase.

Further, (e) the U-phase induction voltage signal Vu, (f) the V-phase induction voltage signal Vv, (g) the W-phase induction voltage signal Vw, (h) the ON synchronized signal S13, and (i) the OFF synchronized signal S13a are illustrated.

Further, in the example of FIG. 4, (j) the UH-phase ON triangular wave S15uh, (k) the UH-phase OFF triangular wave S15uha, (l) the VH-phase ON triangular wave S15vh, (m) the VH-phase OFF triangular wave S15vha, (n) the WH-phase ON triangular wave S15wh, and (o) the WH-phase OFF triangular wave S15wha of the higher arm side of the three phases are illustrated, and the description is omitted for the UL-phase ON triangular wave S15ul, the UL-phase OFF triangular wave S15ula, the VL-phase ON triangular wave S15vl, the VL-phase OFF triangular wave S15vla, the WL-phase ON triangular wave S15wl, and the WL-phase OFF triangular wave S15wla of the three phases on the lower arm side.

In FIG. 4, the gate of the UH element 31, the gate of the UL element 33, the gate of the VH element 35, the gate of the VL element 37, the gate of the WH element 39, and the gate of the WL element 311 illustrated in FIG. 2 are driven by the stator gate drive unit 315 so that a DC set by the positive terminal voltage Vp and the negative terminal voltage Vn is converted into a three-phase AC that is then applied to the U-phase terminal, the V-phase terminal, and the W-phase terminal of the armature winding 313.

Further, the gate of the field switching element 324 illustrated in FIG. 2 is driven by the rotor gate drive unit 317 so that a DC set by the positive terminal voltage VFp and the negative terminal voltage VFn is converted into an AC that is then applied across both ends of the field winding 314. Then, the rotor current flowing through the field winding 314 is converted into a voltage by the resistor 30 so that the voltage across both ends of the resistor 30 is input to the rotor current detecting unit 320. The rotor current detecting unit 320 outputs a signal indicating the detected value $i_{rot}$ of the rotor current to the rotor gate command generating unit 319 in accordance with the voltage applied across the both ends of the resistor 30.

Then, the rotor gate command signal S21 is generated based on the detected value $i_{rot}$ of the rotor current in the rotor gate command generating unit 319. The rotor gate command signal S21 is then input to the rotor gate drive unit 317 to drive the gate of the field switching element 324.

On the other hand, the positive terminal voltage Vp, the negative terminal voltage Vn, the U-phase induction voltage Vu, the V-phase induction voltage Vv, and the W-phase induction voltage Vw are detected in the three-phase phase-voltage detecting unit 318, and are then input as the voltage detection signal S11 to the diode conducting state detecting unit 12 illustrated in FIG. 1.

Then, the diode conducting state detecting unit 12 detects a diode ON state when a forward current flows through the UH diode 32, the UL diode 34, the VH diode 36, the VL diode 38, the WH diode 310, and the WL diode 312 to generate a forward voltage Vf across both ends thereof.

Further, the diode conducting state detecting unit 12 detects a diode OFF state when a forward current does not flow through the UH diode 32, the UL diode 34, the VH diode 36, the VL diode 38, the WH diode 310, and the WL diode 312 and no forward voltage Vf is generated because both ends thereof are open.

When the current flows through the UH diode 32, an amplitude of the U-phase induction voltage Vu drops in a negative direction to Vn−Vf with respect to the negative terminal voltage Vn. When the current flows through the UL diode 34, the amplitude increases in a positive direction to Vp+Vf with respect to the positive terminal voltage Vp. Focusing on the U-phase induction voltage Vu, when the switching devices (UH element and UL element) 31 and 33 are turned ON by synchronous rectification, the amplitude, which is reduced by the amount Vf and is therefore determined by the positive terminal voltage Vp and the negative terminal voltage Vn, is obtained only over the ON interval. Further, when the switching devices (UH element and UL element) 31 and 33 are turned OFF, the amplitude of the U-phase induction voltage Vu returns to that determined by the positive terminal voltage Vp, Vp+Vf, and Vn−Vf.

For example, the diode conducting state detecting unit 12 detects the ON timing of each of the UH diode 32, the VH diode 36, and the WH diode 310 based on Expressions (1) to (3).

An ON state of the UH diode 32:

$$V_p \leq Vu \leq Vp+Vf \qquad (1)$$

an ON state of the VH diode 36:

$$V_p \leq Vv \leq Vp+Vf \qquad (2)$$

an ON state of the WH diode 310:

$$V_p \leq Vw \leq Vp+Vf \qquad (3)$$

Further, the diode conducting state detecting unit 12 detects the OFF timing of each of the UH diode 32, the VH diode 36, and the WH diode 310 based on Expressions (4) to (6).

An OFF state of the UH diode 32:

$$Vu < Vp \quad (4)$$

an OFF state of the VH diode 36:

$$Vv < Vp \quad (5)$$

an OFF state of the WH diode 310:

$$Vw < Vp \quad (6)$$

Further, the diode conducting state detecting unit 12 detects the ON timing of each of the UL diode 34, the VL diode 38, and the WL diode 312 based on Expressions (7) to (9).

An ON state of the UL diode 34:

$$-Vf \leq Vu \leq 0 \quad (7)$$

an ON state of the VL diode 38:

$$-Vf \leq Vv \leq 0 \quad (8)$$

an ON state of the WL diode 312:

$$-Vf \leq Vw \leq 0 \quad (9)$$

Further, the diode conducting state detecting unit 12 detects the OFF timing of each of the UL diode 34, the VL diode 38, and the WL diode 312 based on Expressions (10) to (12).

An OFF state of the UL diode 34:

$$0 < Vu \quad (10)$$

an OFF state of the VL diode 38:

$$0 < Vv \quad (11)$$

an OFF state of the WL diode 312:

$$0 < Vw \quad (12)$$

When phases of the U-phase induction voltage Vu, the V-phase induction voltage Vv, and the W-phase induction voltage Vw are shifted from each other by 120°, the UH diode 32 starts conduction at a timing at which the U-phase induction voltage Vu satisfies Expression (1) for the positive terminal voltage Vp. Then, the UH-phase Don signal detecting unit 12*a* detects the ON state of the UH diode 32 so as to output the UH-phase Don detection signal S12*uh* to the Don signal synthesizing unit 12*g*.

Further, the UH diode 32 stops conduction at a timing at which the U-phase induction voltage Vu satisfies Expression (4) for the positive terminal voltage Vp. Then, the UH-phase Doff signal detecting unit 12*aa* detects the OFF state of the UH diode 32 so as to output the UH-phase Doff detection signal S12*uha* to the Doff signal synthesizing unit 12*ga*.

Similarly, the ON states and the OFF states of the UL diode 34, the VH diode 36, the VL diode 38, the WH diode 310, and the WL diode 312 can be detected by comparing the U-phase induction voltage Vu, the V-phase induction voltage Vv, and the W-phase induction voltage Vw with the positive terminal voltage Vp and the negative terminal voltage Vn.

Then, the diode conducting state detecting unit 12 outputs the UH-phase Don detection signal S12*uh*, the UL-phase Don detection signal S12*ul*, the VH-phase Don detection signal S12*vh*, the VL-phase Don detection signal S12*vl*, the WH-phase Don detection signal S12*wh*, and the WL-phase Don detection signal S12*wl* to the Don signal synthesizing unit 12*g*, the cycle checking unit 14, and the stator gate command generation PWM unit 15.

Then, the Don signal synthesizing unit 12*g* obtains a logical sum of the UH-phase Don detection signal S12*uh*, the UL-phase Don detection signal S12*ul*, the VH-phase Don detection signal S12*vh*, the VL-phase Don detection signal S12*vl*, the WH-phase Don detection signal S12*wh*, and the WL-phase Don detection signal S12*wl* to generate the diode ON synthesized signal S12, and outputs the thus generated signal to the ON PLL circuit 121.

Further, the diode conducting state detecting unit 12 outputs the UH-phase Doff detection signal S12*uha*, the UL-phase Doff detection signal S12*ula*, the VH-phase Doff detection signal S12*vha*, the VL-phase Doff detection signal S12*vla*, the WH-phase Doff detection signal S12*wha*, and the WL-phase Doff detection signal S12*wla* to the Doff signal synthesizing unit 12*ga*, the cycle checking unit 14, and the stator gate command generation PWM unit 15.

Then, the Doff signal synthesizing unit 12*ga* obtains a logical sum of the UH-phase Doff detection signal S12*uha*, the UL-phase Doff detection signal S12*ula*, the VH-phase Doff detection signal S12*vha*, the VL-phase Doff detection signal S12*vla*, the WH-phase Doff detection signal S12*wha*, and the WL-phase Doff detection signal S12*wla* to generate the diode OFF synthesized signal S12*a*, and outputs the thus generated signal to the OFF PLL circuit 122.

Then, the ON synchronized signal S13 that has been subjected to the synchronization control based on the diode ON synthesized signal S12 is generated in the ON PLL circuit 121, whereas the OFF synchronized signal S13*a* that has been subjected to the synchronization control based on the diode OFF synthesized signal S12*a* is generated in the OFF PLL circuit 122.

The ON PLL circuit 121 is locked and the ON synchronized signal S13 is generated only when the diode ON timings for the six phases corresponding to the UH phase, the UL phase, the VH phase, the VL phase, the WH phase, and the WL phase are at substantially equal intervals. Therefore, through the synchronization control based on the diode ON synthesized signal S12, non-occurrence of short circuit or open circuit between the six phases corresponding to the UH phase, the UL phase, the VH phase, the VL phase, the WH phase, and the WL phase can be detected, and the shifts of the V phase and the W phase from the U phase respectively by +120° and −120° or the shift of the UL phase from the UH phase by 180° can be detected.

Similarly, the OFF PLL circuit 122 is locked and the OFF synchronized signal S13*a* is generated only when the diode OFF timings for the six phases corresponding to the UH phase, the UL phase, the VH phase, the VL phase, the WH phase, and the WL phase are at substantially equal intervals. Therefore, through the synchronization control based on the diode OFF synthesized signal S12*a*, non-occurrence of short circuit or open circuit between the six phases corresponding to the UH phase, the UL phase, the VH phase, the VL phase, the WH phase, and the WL phase can be detected, and the shifts of the V phase and the W phase from the U phase respectively by +120° and −120° or the shift of the UL phase from the UH phase by 180° can be detected.

Further, the diode ON timing and the diode OFF timing are set independently of each other. As a result, even when an interval between the diode ON timing and the diode OFF timing increases or decreases in accordance with a magnitude of the amount of power generation, the ON PLL circuit 121 and the OFF PLL circuit 122 can be locked in a stable manner. Therefore, the ON synchronized signal S13 and the OFF synchronized signal S13*a* can be generated stably.

Figure 5:
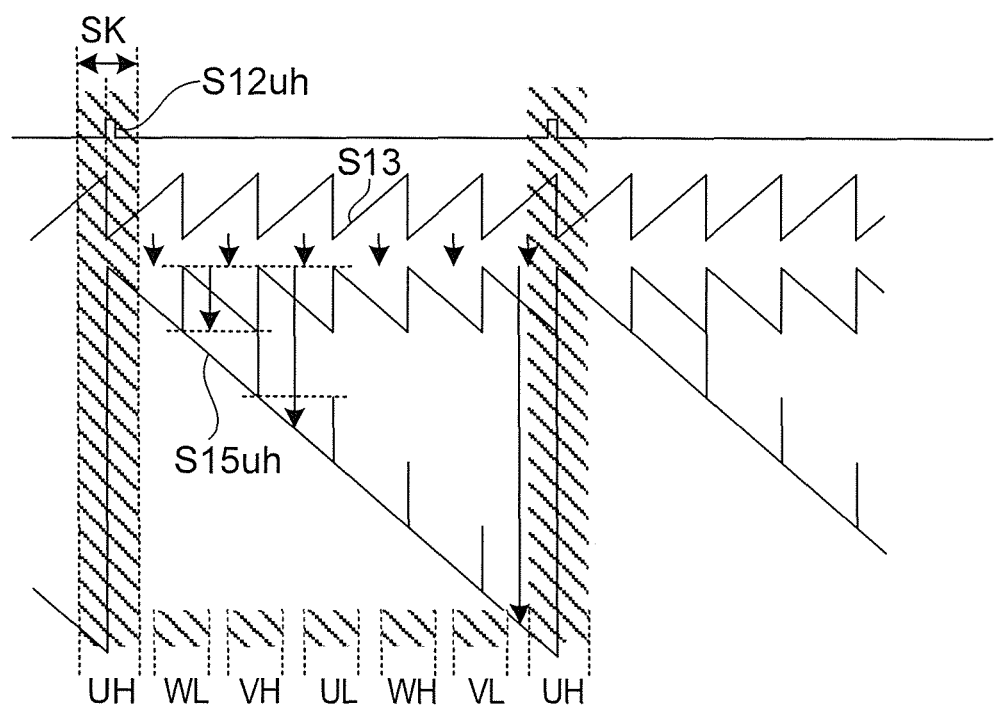
FIG. 5 is a timing chart for illustrating a monitoring method carried out by a cycle checking unit illustrated in FIG. 1.

FIG. 5 is a timing chart for illustrating a method of monitoring whether or not the cycles in the respective phases and the order of detection are correct over all the phases, which is carried out by the cycle checking unit 14 illustrated in FIG. 1. In FIG. 5, the cycle checking unit 14 provides a predetermined synchronization determination interval SK for each of the UH phase, the UL phase, the VH phase, the VL phase, the WH phase, and the WL phase so that the predetermined synchronization determination interval SK extends across, for example, a time axis of the ON synchronized signal S13.

Then, the synchronization determination intervals SK are connected over all the phases corresponding to the UH phase, the UL phase, the VH phase, the VL phase, the WH phase, and the WL phase. Whether or not the UH-phase Don detection signal S12uh, the UL-phase Don detection signal S12ul, the VH-phase Don detection signal S12vh, the VL-phase Don detection signal S12vl, the WH-phase Don detection signal S12wh, and the WL-phase Don detection signal S12wl fall respectively into the synchronization determination intervals SK of the UH phase, the UL phase, the VH phase, the VL phase, the WH phase, and the WL phase is confirmed so as to determine whether or not a detection cycle for the diode ON timing is kept. After it is confirmed that the detection cycle for the diode ON timing is kept, the cycle checking unit 14 outputs a synchronization determination signal S14 to the stator gate command generation PWM unit 15.

The cycle checking unit 14 can also determine whether or not a detection cycle for the diode OFF timing is kept in the same manner as determination processing for the diode ON timing. In this case, the cycle checking unit 14 holds Curr_phase[i] (i=0, 1, 2, 3, 4, 5) and Last_phase[i] (i=0, 1, 2, 3, 4, 5) so as to determine which phase a current phase corresponds to. Curr_phase[i] and Last_phase[i] are data, each being written and rewritten in an area allocated at a specific position, for example, a flag, on a memory.

FIGS. 6A and 6B are a diagram and a chart for illustrating phase determination performed in the cycle checking unit 14, in which FIG. 6A is a block diagram for illustrating a schematic configuration of phase detection registers configured to determine which phase the current phase corresponds to, and FIG. 6B is a chart for illustrating the ON synchronized signal. In FIG. 6, each time one cycle Y1 of the ON synchronized signal S13 is completed, an argument i of Curr_phase[i] and Last_phase[i] is incremented by 1 to become i+1. When the argument i is 5, the argument subsequently becomes 0. As a result, each of Curr_phase[i] and Last_phase[i] forms an endless loop.

In this case, the cycle checking unit 14 includes phase detection registers CR0 to CR5 configured to hold phase data respectively detected at Curr_phase[i] (i=0, 1, 2, 3, 4, 5) and phase detection registers LR0 to LR5 configured to hold phase data transferred with a condition from Curr_phase[i] (i=0, 1, 2, 3, 4, 5).

As the phase data, in a case of the three phases, seven kinds including:

null indicating a failure of the phase detection;
UH indicating a successful detection of the UH-phase;
UL indicating a successful detection of the UL-phase;
VH indicating a successful detection of the VH-phase;
VL indicating a successful detection of the VL-phase;
WH indicating a successful detection of the WH-phase; and
WL indicating a successful detection of the WL-phase, are prepared.

Figure 7:
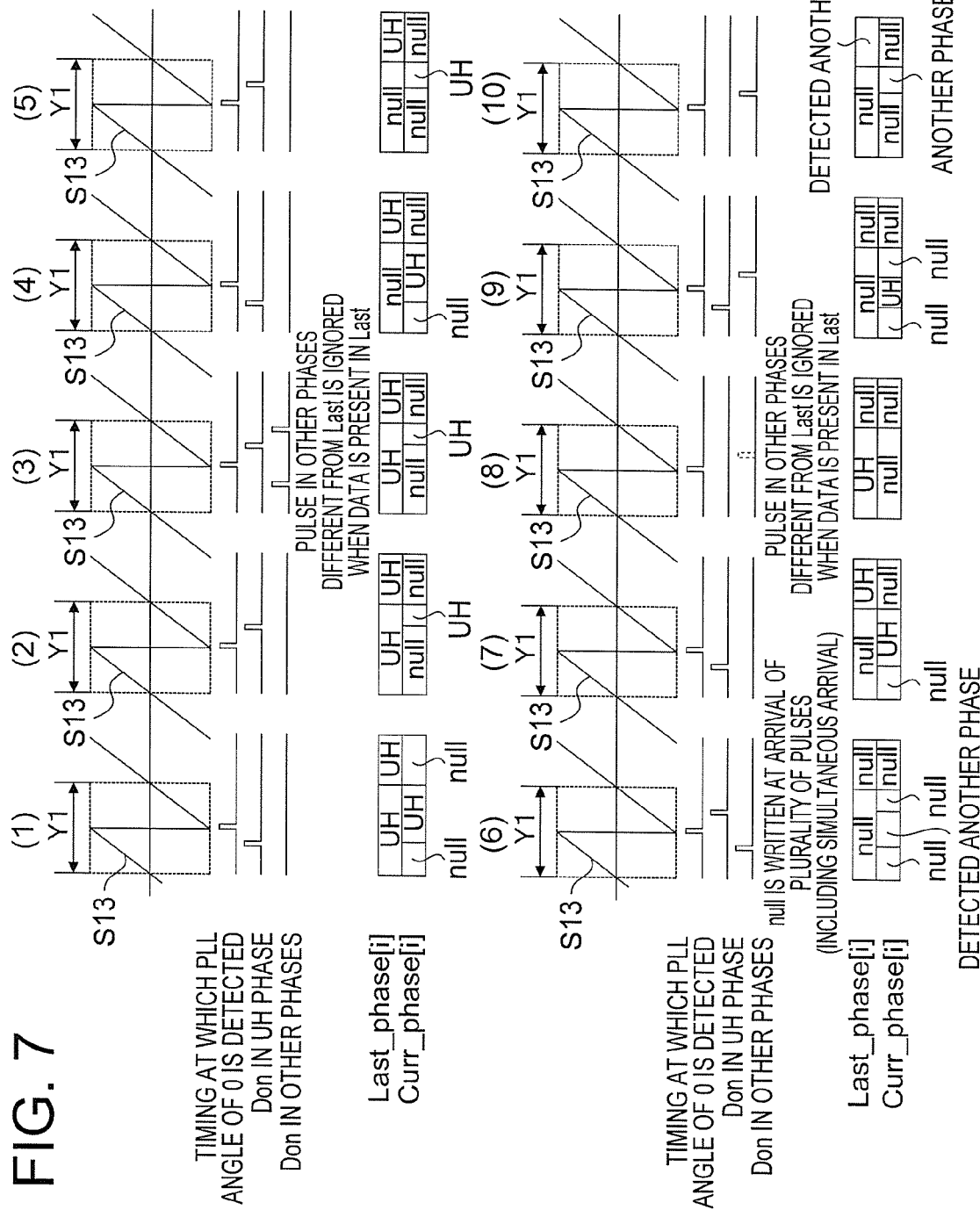
FIG. 7 is a diagram for illustrating a method of detecting and updating a current phase and a previous phase, which is carried out by the power converter illustrated in FIG. 1.

FIG. 7 is a chart for illustrating a list of methods of detecting and updating a current phase and a previous phase for the power converter illustrated in FIG. 1 separately for each case. Although the UH-phase is illustrated in FIG. 7 as an example, the same applies to the other phases, that is, the UL phase, the VH phase, the VL phase, the WH phase, and the WL phase.

For each of ten patterns (1) to (10), the ON synchronized signal S13, a timing at which a PLL angle of 0 is detected, a Don (diode ON) timing in the UH phase, a Don (diode ON) timing in the other phases, Curr_phase[i], and Last_phase[i] are illustrated.

In FIG. 7, the diode ON timing is detected for each cycle Y1 of the ON synchronized signal S13. Information Curr_phase[i]=UH is written in Curr_phase[i] at the timing of detection of the diode ON in the UH phase. Then, the information of Curr_phase[i] is basically transferred to Last_phase[i] each time one cycle Y1 of the ON synchronized signal S13 is completed. In this case, when the previous phase detection and the current phase detection are the same, the data of Last_phase[i] is updated. When the previous phase detection and the current phase detection are different, null is written so that the continuous detection of the same phase can be confirmed.

The information of Curr_phase[i] is basically transferred to Last_phase[i] (n=0, 1, 2, 3, 4, 5). For example, when Last_phase[i]=UH and Curr_phase[i]=UH, Last_phase[i]=UH is set for the subsequent cycle Y1 of the ON synchronized signal S13.

In practice, detailed rules for determining a subsequent state of Last_phase[i] can be determined from a state of Last_phase[i] and a state of Curr_phase[i]. Specifically, after Last_phase[i] is determined with a condition for determination of Last_phase[i] in the ten patterns (1) to (10) of FIG. 7, the synchronization determination signal S14 indicating a state in which the synchronization and the phase detection are successful can be output under a condition that a detected phase state of Last_phase[i] remains unchanged for a preset number of cycles.

In FIG. 7, in the pattern (3), when data is present in Last, a pulse in the other phases, which is different from that in Last, is ignored. In the pattern (6), null is written when the plurality of pulses arrive (including simultaneous arrival). In the pattern (8), when data is present in Last, a pulse in the other phases, which is different from that in Last, is ignored.

Further, besides the synchronization determination signal S14, the cycle checking unit 14 outputs a value of Last_phase[n] in the current cycle of the ON synchronized signal S13 as phase estimation information S14a to the stator gate command generation PWM unit 15. Similarly, the cycle checking unit 14 outputs a value of Last_phase[n] in the current cycle of the OFF synchronized signal S13a as phase estimation information S14b to the stator gate command generation PWM unit 15.

Focusing only on the UH-phase in FIG. 1, in a simplified configuration example, the U-phase higher arm ON triangular wave generating unit 15a generates the UH-phase ON triangular wave S15uh based on a count value counted at a time interval between activation of the ON synchronized signal S13 at 0° in the UH-phase detection interval in the previous cycle and reset of the ON synchronized signal S13 at 0° in the UH-phase detection interval in the current cycle.

In the simplified configuration example, the U-phase higher arm OFF triangular wave generating unit 15aa generates the UH-phase OFF triangular wave S15uha based on a count value counted at a time interval between activation of the OFF synchronized signal S13a at 0° in the UH-phase detection interval in the previous cycle and reset of the OFF synchronized signal S13a at 0° in the UH-phase detection interval in the current cycle.

The stator gate command generation PWM unit 15 generates the ON triangular waves and the OFF triangular waves even for the other phases corresponding to the UL phase, the VH phase, the VL phase, the WH phase, and the WL phase in the same manner as the method of generating the UH-phase ON triangular wave S15*uh* and the UH-phase OFF triangular wave S15*uha*.

Then, assuming that the UH-phase ON triangular wave S15*uh* and the UH-phase OFF triangular wave S15*uha* are generated so as to have descending slopes as illustrated in FIG. 4, the U-phase higher arm gate command signal generating unit 15*ab* generates the gate command signal S16*uh* so that the UH element 31 is turned ON in an interval in which a level of the UH-phase ON triangular wave S15*uh* is higher than a level of the UH-phase OFF triangular wave S15*uha*.

When the UH element 31 is turned ON in the interval in which the level of the UH-phase ON triangular wave S15*uh* is higher than the level of the UH-phase OFF triangular wave S15*uha*, a margin may be allowed in the ON interval of the UH element 31 in view of avoidance of the backflow of the current flowing through the UH element 31 and the like.

For example, focusing only on the UH-phase ON triangular wave S15*uh* for the description, a level LV4 indicating the number of degrees in electrical angle advanced from a position at 0°, at which the UH element 31 is to be turned ON in each cycle of the ON synchronized signal S13, may be provided for comparison with the UH-phase ON triangular wave S15*uh*.

Then, focusing only on the UH-phase OFF triangular wave S15*uha* for the description, a level LV1 indicating the number of degrees in electrical angle advanced from a position at 360°, at which the UH element 31 is to be turned OFF in each cycle of the ON synchronized signal S13*a*, may be provided for comparison with the UH-phase OFF triangular wave S15*uha*.

Further, a level LV3 indicating an ON interval angle of the UH element 31 in the current synchronous rectification may be provided. The level LV3 can determine the number of degrees in electrical angle to which the UH element 31 is kept ON as the synchronous rectification within the interval in which the UH element 31 can be turned ON after a fall time t1 of the UH-phase Don detection signal S12*uh* so that the UH element 31 is turned ON after the UH diode 32 is turned ON in the synchronous rectification.

Then, an interval after the UH-phase ON triangular wave S15*uh* reaches the level LV4 and before the UH-phase ON triangular wave S15*uh* reaches the level LV3 before the UH-phase OFF triangular wave S15*uha* reaches the level LV1 after the ON timing of the UH diode can be defined as the ON interval of the UH element 31.

In FIG. 1, the U-phase higher arm gate command signal generating unit 15*ab* compares a level of the UH-phase ON triangular wave S15*uh* with the level LV3 to set the ON interval of the UH element 31.

Specifically, in part (j) and part (k) of FIG. 4, the time t1 indicates a fall of the UH-phase Don detection signal S12*uh*, a time t2 indicates a time at which the UH-phase ON triangular wave S15*uh* reaches the level LV4, a time t3 indicates a time at which the UH-phase ON triangular wave S15*uh* reaches the level LV3, a time t4 indicates a time at which the UH-phase OFF triangular wave S15*uha* reaches the level LV1, PMA from the time t1 to the time t2 indicates a margin time period for the UH-phase ON triangular wave S15*uh*, TMA from the time t4 to a rise of the UH-phase OFF triangular wave S15*uha* is a margin time period for the UH-phase OFF triangular wave S15*uha*, and KON from a time after the time t1 to a time before the time t3 indicates an ON interval of the UH element 31.

Even for the other phases corresponding to the UL phase, the VH phase, the VL phase, the WH phase, and the WL phase, the stator gate command generation PWM unit 15 generates gate command signals S16*ul*, S16*vh*, S16*vl*, S16*wh*, and S16*wl* in the same manner as the method of generating the gate command signal S16*uh*.

As a result, a detection sensor for a rotational position and a rotation angle of the rotary electric motor and a converter unit configured to convert an output signal from the detection sensor into data are not required to realize the synchronous rectification. At the same time, a load torque of the rotary electric motor can be stabilized without depending on accuracy in mounting of the above-mentioned components.

The stator gate ON-state detecting unit 16 detects the ON timings and the OFF timings of the UH element 31, the UL element 33, the VH element 35, the VL element 37, the WH element 39, and the WL element 311 based on the voltage detection signal S11 so as to output a switching element ON detection signal S17.

The stator gate command monitoring unit 17 compares the ON timings of the UH element 31, the UL element 33, the VH element 35, the VL element 37, the WH element 39, and the WL element 311 with the stator gate command signal S16 to monitor a synchronous rectification operation so as to output a diode ON detection interval signal S18.

Further, the stator gate command generation PWM unit 15 outputs a diode ON detection interval measurement signal S19 based on the diode ON detection interval signal S18 output from the stator gate command monitoring unit 17, for example, from a gate command signal adjusting unit 1501.

The diode ON-interval monitoring unit 18 outputs a diode ON detection interval change rate signal S20 based on the diode ON detection interval measurement signal S19 output from the gate command signal adjusting unit 1501.

The stator gate command generation PWM unit 15 generates the stator gate command signal S16 based on the ON synchronized signal S13, the OFF synchronized signal S13*a*, a result of monitoring by the stator gate command monitoring unit 17 (diode ON detection interval signal S18), and a result of monitoring by the diode ON-interval monitoring unit 18 (diode ON detection interval change rate signal S20).

Then, the stator gate command monitoring unit 17 detects whether or not the turn-OFF of the UH element 31, the UL element 33, the VH element 35, the VL element 37, the WH element 39, and the WL element 311 and the turn-OFF of the UH diode 32, the UL diode 34, the VH diode 36, the VL diode 38, the WH diode 310, and the WL diode 312 have been performed as estimated by the gate command generation PWM unit 15.

Then, focusing only on the UH phase in the following description, the stator gate command monitoring unit 17 monitors whether or not the ON time period of the UH diode 32 can be detected after the turn-OFF of the UH element 31 within a time period from the OFF timing of the UH element 31 to the OFF timing of the UH diode 32, and notifies the stator gate command generation PWM unit 15 of a time length thereof when the ON time period is successfully detected.

Then, the stator gate command generation PWM unit 15 determines a detected state of a time allowance for ON/OFF of the UH element 31 in the synchronous rectification in the gate command signal adjusting unit 1501 so as to set the ON interval of the UH element 31 shorter or longer than that in the previous cycle based on the detected state.

As a result, efficiency of the synchronous rectification operation can be maximally increased while responding to an operating condition of the rotary electric motor in real time.

Figure 8:
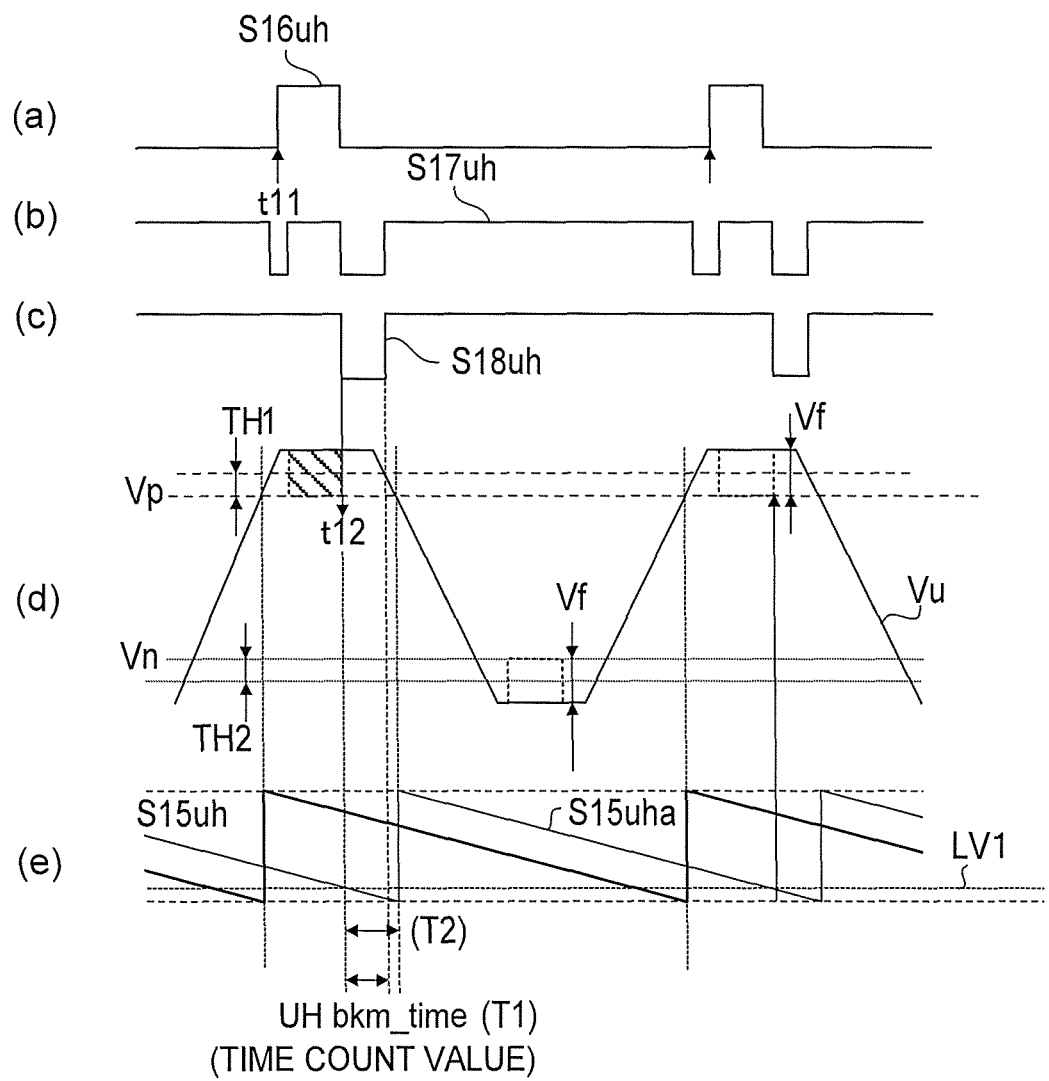
FIG. 8 is a timing chart for illustrating signal waveforms from units of the power converter illustrated in FIG. 1.

FIG. 8 is a timing chart for illustrating signal waveforms from the units of the power converter illustrated in FIG. 1. FIG. 8 is a timing chart for the U-phase higher arm side, in which part (a) is for illustrating the gate command signal S16uh, part (b) is for illustrating the UH element ON detection signal S17uh, part (c) is for illustrating the UH diode ON detection interval signal S18uh, part (d) is for illustrating the U-phase induction voltage Vu, and part (e) is for illustrating the UH-phase ON triangular wave S15uh and the UH-phase OFF triangular wave S15uha.

In FIG. 8, focusing only on the U-phase induction voltage Vu for the description, a threshold value TH1 for detecting a voltage change for the amount of the forward voltage Vf of the UH diode 32 from the positive terminal voltage Vp is obtained (set) with respect to the positive terminal voltage Vp for the U-phase induction voltage Vu. The threshold value TH1 only needs to be set around Vf/2.

In this case, when the detection of ON of the UH element 31 and the threshold value TH1 are set not based on a ground potential as a reference but based on a differential from the positive terminal voltage Vp so as to be detected by a differential comparison amplifier (provided to the stator gate ON-state detecting unit 16; not shown), detection accuracy can be improved.

Similarly, a threshold value TH2 for detecting a voltage change for the amount of the forward voltage Vf of the UL diode 34 from the negative terminal voltage Vn is obtained (set) with respect to the negative terminal voltage Vn for the U-phase induction voltage Vu. The threshold value TH2 only needs to be set around Vf/2.

In this case, when the detection of ON of the UL element 33 and the threshold value TH2 are set not based on the ground potential as a reference but based on a differential from the negative terminal voltage Vn so as to be detected by the above-mentioned differential comparison amplifier, the detection accuracy can be improved.

Then, the stator gate ON-state detecting unit 16 outputs the UH element ON detection signal S17uh as a result of detection of the gate ON-state of the UH element 31 to the stator gate command monitoring unit 17.

Similarly, the stator gate ON-state detecting unit 16 outputs the UL element ON detection signal S17ul as a result of detection of the gate ON-state of the UL element 33, outputs the VH element ON detection signal S17vh as a result of detection of the gate ON-state of the VH element 35, outputs the VL element ON detection signal S17vl as a result of detection of the gate ON-state of the VL element 37, outputs the WH element ON detection signal S17wh as a result of detection of the gate ON-state of the WH element 39, and outputs the WL element ON detection signal S17wl as a result of detection of the gate ON-state of the WL element 311.

The stator gate command monitoring unit 17 detects an "L" (low) interval (UH_bkm_time (time count value)) from a fall timing t12 of the UH element ON detection signal S17uh in an event after a rise timing t11 of the gate command signal S16uh output from the stator gate command generation PWM unit 15 as a point of start so as to generate the UH diode ON detection interval signal S18uh after the turn-OFF of the UH element 31, and then outputs the thus generated signal to the stator gate command generation PWM unit 15.

Similarly, the stator gate command monitoring unit 17 outputs the UL diode ON detection interval signal S18ul after the turn-OFF of the UL element 33, outputs the VH diode ON detection interval signal S18vh after the turn-OFF of the VH element 35, outputs the VL diode ON detection interval signal S18vl after the turn-OFF of the VL element 37, outputs the WH diode ON detection interval signal S18wh after the turn-OFF of the WH element 39, and outputs the WL diode ON detection interval signal S18wl after the turn-OFF of the WL element 311.

The stator gate command generation PWM unit 15 measures time (T1) (=UH_bkm_time) of a detection interval for the UH diode ON detection interval signal S18 by a first counter (not shown) configured to count the time in a predetermined time cycle (H1), e.g., 1 usec, and outputs a UH diode ON detection interval measurement signal S19uh from the gate command signal adjusting unit 1501.

Similarly, the gate command signal adjusting unit 1501 of the stator gate command generation PWM unit 15 outputs a UL diode ON detection interval measurement signal S19ul, a VH diode ON detection interval measurement signal S19vh, a VL diode ON detection interval measurement signal S19vl, a WH diode ON detection interval measurement signal S19wh, and a WL diode ON detection interval measurement signal S19wl.

Further, the gate command signal adjusting unit 1501 of the stator gate command generation PWM unit 15 compares the current UH-phase OFF triangular wave S15uha and the level LV1 with each other so as to cyclically measure time (T2) of an interval in which the level LV1 is higher than the level of the UH-phase OFF triangular wave S15uha by a second counter (not shown) configured to count the time in the predetermined time cycle (H1).

Then, the gate command signal adjusting unit 1501 of the stator gate command generation PWM unit 15 compares the above-mentioned time (T1) and time (T2) with each other so as to monitor whether or not the OFF timing of the UH element 31 is too early or too late. When the OFF timing of the UH element 31 is too early, the level LV1 is lowered to delay the OFF timing. When the OFF timing of the UH element 31 is too late, the level LV1 can be raised to advance the OFF timing.

As a result, the stator gate command generation PWM unit 15 can generate the stator gate command signal S16 so that the UH element 31 can be turned OFF while the OFF timing of the UH element 31 is constantly kept appropriate with respect to a fluctuation in rotation of the rotary electric motor.

The diode ON-interval monitoring unit 18 generates the diode ON detection interval change rate signal S20 based on the UH diode ON detection interval, the UL diode ON detection interval, the VH diode ON detection interval, the VL diode ON detection interval, the WH diode ON detection interval, and the WL diode ON detection interval, which are counted in the stator gate command generation PWM unit 15.

The diode ON detection interval change rate signal S20 indicates a change rate from the diode ON detection interval in the second last phase to the diode ON detection interval in the last phase. Taking the UH phase as an example, a change rate from the WH diode ON detection interval in the second last phase to the VL diode detection interval in the last phase is output as a diode ON detection interval change rate signal S20uh.

The diode ON detection interval change rate signal S20
outputs a change rate from the WL diode ON detection interval to the VH diode detection interval as a UL diode ON detection interval change rate signal S20ul, outputs a change rate from the UH diode ON detection interval to the WL diode detection interval as a VH diode ON detection interval change rate signal S20vh, outputs a change rate from the UL diode ON detection interval to the WH diode detection interval as a VL diode ON detection interval change rate signal S20vl, outputs a change rate from the VH diode ON detection interval to the UL diode detection interval as a WH diode ON detection interval change rate signal S20wh, and outputs a change rate from the VL diode ON detection interval to the UH diode detection interval as a WL diode ON detection interval change rate signal S20wl.

When the diode ON detection interval change rate signal S20 indicates a decrease on a negative side and a rate of decrease exceeds a predetermined value, the gate command signal adjusting unit 1501 of the stator gate command generation PWM unit 15 determines that the diode ON detection interval is suddenly reduced, specifically, a sudden acceleration is made, and therefore adjusts the gate command signal S16 so that the level LV1 is significantly raised (by the amount of voltage equal to or larger than a predetermined value) to significantly advance the OFF timing (by the amount of time equal to or larger than a predetermined time period). Further, when the diode ON detection interval change rate signal S20 is on the negative side and the rate of decrease is equal to or smaller than the predetermined value, or the diode ON detection interval change rate signal S20 is on a positive side, the gate command signal S16 is adjusted so as to control the OFF timing based on the result of comparison between T1 and T2.

As a result, the stator gate command generation PWM unit 15 can reliably turn OFF the UH element 31 before the turn-OFF of the diode even at the time of sudden acceleration.

Further, the gate command signal adjusting unit 1501 of the stator gate command generation PWM unit 15 changes the amount of increase of the level LV1 in accordance with the rate of decrease of the diode ON detection interval change rate signal S20 to adjust the gate command signal S16 so as to change a time duration by which the OFF timing is advanced. As a result, the UH element 31 can be reliably turned OFF before the turn-OFF of the diode without extremely decreasing the ON time of the switching element.

In this case, the gate command signal adjusting unit 1501 stores in advance, for example, a table for showing a relationship between the change rate of the diode ON detection interval change rate signal S20 and the amount of adjustment of the level LV1 in a memory (not shown) or the like so as to determine the amount of adjustment of the level LV1 in accordance with the table. The table is set so as to increase the amount of adjustment of the level LV1 as the rate of decrease increases.

As described above, according to the first embodiment, there can be realized the power converter for a vehicle, which is capable of reliably turning OFF the switching element before the turn-OFF of the diode even with a fluctuation in rpm so as not to generate the backflow of the current.

The Don signal synthesizing unit 12g, the Doff signal synthesizing unit 12ga, the synchronization detection PLL unit 13, and the cycle checking unit 14 are included in a synchronized signal generating and monitoring unit.

INDUSTRIAL APPLICABILITY

The power converter according to the present invention or the like is applicable to various kinds of rotary electric motors.

REFERENCE SIGNS LIST

11 power converting unit
12 diode conducting state detecting unit
12a U-phase higher arm diode ON signal detecting unit
12b U-phase lower arm diode ON signal detecting unit
12c V-phase higher arm diode ON signal detecting unit
12d V-phase lower arm diode ON signal detecting unit
12e W-phase higher arm diode ON signal detecting unit
12f W-phase lower arm diode ON signal detecting unit
12aa U-phase higher arm diode OFF signal detecting unit
12ba U-phase lower arm diode OFF signal detecting unit
12ca V-phase higher arm diode OFF-signal detecting unit
12da V-phase lower arm diode OFF-signal detecting unit
12ea W-phase higher arm diode OFF-signal detecting unit
12fa W-phase lower arm diode OFF-signal detecting unit
12g diode ON-signal synthesizing unit
12ga diode OFF-signal synthesizing unit
120 gate control unit
121 ON PLL circuit
122 OFF PLL circuit
13 synchronization detection PLL unit
14 cycle checking unit
15 stator gate command generation PWM unit
15a U-phase higher arm ON triangular wave generating unit
15aa U-phase higher arm OFF triangular wave generating unit
15ab U-phase higher arm gate command signal generating unit
15b U-phase lower arm ON triangular wave generating unit
15ba U-phase lower arm OFF triangular wave generating unit
15bb U-phase lower arm gate command signal generating unit
15c V-phase higher arm ON triangular wave generating unit
15ca V-phase higher arm OFF triangular wave generating unit
15cb V-phase higher arm gate command signal generating unit
15d V-phase lower arm ON triangular wave generating unit
15da V-phase lower arm OFF triangular wave generating unit
15db V-phase lower arm gate command signal generating unit
15e W-phase higher arm ON triangular wave generating unit
15ea W-phase higher arm OFF triangular wave generating unit
15eb W-phase higher arm gate command signal generating unit
15f W-phase lower arm ON triangular wave generating unit 15fa W-phase lower arm OFF triangular wave generating unit
15fb W-phase lower arm gate command signal generating unit
16 stator gate ON-state detecting unit
17 stator gate command monitoring unit
18 diode ON-interval monitoring unit
30 resistor
31 U-phase higher arm switching element
32 U-phase higher arm freewheeling diode
33 U-phase lower arm switching element
34 U-phase lower arm freewheeling diode
35 V-phase higher arm switching element
36 V-phase higher arm freewheeling diode
37 V-phase lower arm switching element
38 V-phase lower arm freewheeling diode
39 W-phase higher arm switching element
310 W-phase higher arm freewheeling diode
311 W-phase lower arm switching element
312 W-phase lower arm freewheeling diode
313 armature winding
314 field winding
315 stator gate drive unit
317 rotor gate drive unit
318 three-phase phase-voltage detecting unit
319 rotor gate command generating unit
320 rotor current detecting unit
324 field switching element
325 diode
326 field freewheeling diode
51 phase-locked loop circuit (PLL)
52 1/n divider
53 phase comparator (PD)
54 PI controller
55 voltage control oscillator (VCO)
53 integrator (1/s)
CR0-CR5, LR0-LR5 phase detection register
1501 gate command signal adjusting unit

The invention claimed is:
1. A power converter, comprising:
a power converting unit comprising:
2N switching elements for N phases, where N is an integer equal to or larger than 2, the 2N switching elements being provided for each of a higher arm and a lower arm; and
2N freewheeling diodes respectively connected in parallel to the 2N switching elements; and
a gate control unit comprising:
a diode conducting state detecting unit configured to detect ON timings and OFF timings of the 2N freewheeling diodes from voltages of portions of the power converting unit;
a synchronized signal generating and monitoring unit configured to generate an ON synchronized signal being subjected to synchronization control based on the ON timings of the 2N freewheeling diodes and to generate an OFF synchronized signal being subjected to synchronization control based on the OFF timings of the 2N freewheeling diodes, the ON timings and the OFF timings being detected by the diode conducting state detecting unit;
a gate command generation PWM unit configured to generate a gate command signal for performing switching control on the switching element based on the ON synchronized signal and the OFF synchronized signal;
a gate ON-state detecting unit configured to detect ON timings and OFF timings of the 2N switching elements from the voltages of the portions of the power converting unit;
a gate command monitoring unit configured to generate a diode ON detection interval signal based on the gate ON timings of the 2N switching elements, the gate ON timings being detected by the gate ON-state detecting unit, and the gate command signal generated by the gate command generation PWM unit; and
a diode ON-interval monitoring unit configured to measure a change rate of the diode ON detection interval signal generated by the gate command monitoring unit,
wherein the gate command generation PWM unit is configured to adjust the gate command signal so as to adjust the OFF timing of the switching element in accordance with the change rate of the diode ON detection interval signal measured by the diode ON-interval monitoring unit.
2. The power converter according to claim 1, wherein:
the gate command generation PWM unit comprises a gate command signal adjusting unit configured to generate a diode ON detection interval measurement signal obtained by measuring an ON interval of the diode ON detection interval signal generated by the gate command monitoring unit;
the diode ON-interval monitoring unit is configured to measure a change rate of an ON interval measurement value based on the diode ON detection interval measurement signal generated by the gate command signal adjusting unit so as to generate a diode ON detection interval change rate signal; and
the gate command signal adjusting unit is configured to adjust the gate command signal so that the OFF timing of the switching element is advanced by a time period equal to or longer than a predetermined time period when the diode ON detection interval change rate signal exhibits a decrease on a negative side and a rate of decrease exceeds a predetermined value.
3. The power converter according to claim 1, wherein:
the gate command generation PWM unit comprises a gate command signal adjusting unit configured to generate a diode ON detection interval measurement signal obtained by measuring an ON interval of the diode ON detection interval signal generated by the gate command monitoring unit;
the diode ON-interval monitoring unit is configured to generate a diode ON detection interval change rate signal by measuring a change rate of an ON interval measurement value based on the diode ON detection interval measurement signal generated by the gate command signal adjusting unit; and
the gate command signal adjusting unit is configured to adjust the gate command signal so as to change a time duration by which the OFF timing of the switching element is advanced in accordance with a rate of decrease of the diode ON detection interval change rate signal when the diode ON detection interval change rate signal exhibits a decrease on a negative side.
4. The power converter according to claim 1, wherein the OFF timing of the switching element is before the OFF timing of the freewheeling diode.
5. The power converter according to claim 2, wherein the OFF timing of the switching element is before the OFF timing of the freewheeling diode.

6. The power converter according to claim 3, wherein the OFF timing of the switching element is before the OFF timing of the freewheeling diode.

7. A power conversion control method for controlling, with a gate control unit, a power converting unit, the power converting unit comprising:

2N switching elements for N phases, where N is an integer equal to or larger than 2, the 2N switching elements being provided for each of a higher arm and a lower arm; and 2N freewheeling diodes respectively connected in parallel to the 2N switching elements, the power conversion control method comprising the step of:

detecting ON timings and OFF timings of the 2N freewheeling diodes from voltages of portions of the power converting unit;

generating an ON synchronized signal being subjected to synchronization control based on the ON timings of the 2N freewheeling diodes and generating an OFF synchronized signal being subjected to synchronization control based on the OFF timings of the 2N freewheeling diodes, the ON timings and the OFF timings being detected by a diode conducting state detecting unit;

generating, with PWM, a gate command signal for performing switching control on the switching element based on the ON synchronized signal and the OFF synchronized signal;

detecting ON timings and OFF timings of the 2N switching elements from the voltages of the portions of the power converting unit;

generating a diode ON detection interval signal based on the detected gate ON timings of the 2N switching elements and the generated gate command signal; and measuring a change rate of the detected diode ON detection interval signal, wherein the generating of the gate command signal comprises adjusting the gate command signal so as to adjust the OFF timing of the switching element in accordance with the change rate of the diode ON detection interval signal.

* * * * *